UNITED STATES PATENT OFFICE.

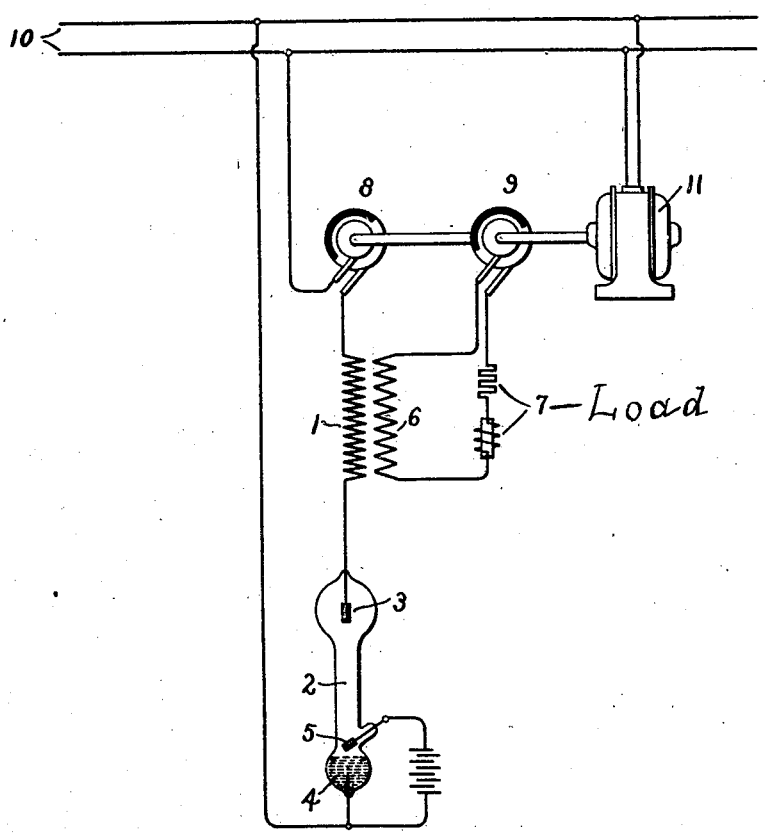

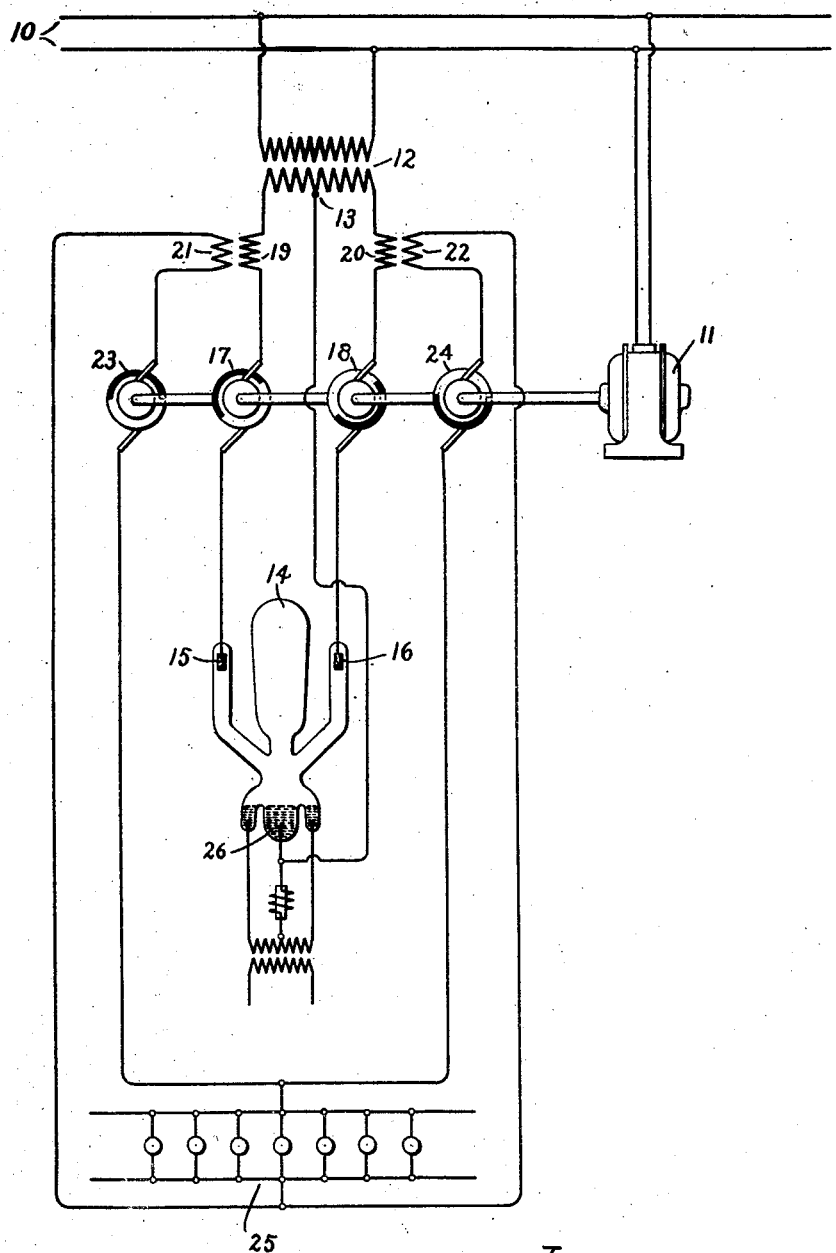

FRED W. LYLE, OF LYNN, MASSACHUSETTS, ASSIGNOR TO GENERAL ELECTRIC COMPANY, A CORPORATION OF NEW YORK.

METHOD OF AND MEANS FOR TRANSFORMING CURRENT.

1,185,418.   Specification of Letters Patent.   Patented May 30, 1916.

Application filed September 22, 1911, Serial No. 650,807. Renewed February 2, 1916. Serial No. 75,859.

*To all whom it may concern:*

Be it known that I, FRED W. LYLE, a citizen of the United States, residing at Lynn, county of Essex, State of Massachusets, have invented certain new and useful Improvements in Methods of and Means for Transforming Current, of which the following is a specification.

One object of my present invention is to provide a means and a method whereby direct current of large amperage and low voltage may be derived from an alternating current source of smaller amperage and higher voltage.

According to one embodiment of the present invention, the system includes a mercury arc rectifier capable of running at high voltage, but comparatively small current. The rectifier instead of being connected as formerly to the secondary winding of the transformer, is included in the primary circuit, the secondary circuit being provided with means for dissipating the residual magnetic flux in the transformer after each pulsation of primary current transmitted by the rectifier.

The details of the invention will be better understood by reference to the following description taken in conjunction with the accompanying drawings.

Figure 1 is a diagram showing an arrangement of elements suited to the production of a pulsating current; and Fig. 2 shows a connection for using both half waves of the alternating current source.

In the construction shown, the transformer primary 1 is connected in series with a mercury arc rectifier 2 having a main anode 3, a main cathode 4 and an auxiliary anode 5 for the maintenance of a side branch arc which is in constant operation. The transformer secondary 6 is connected with a load circuit containing translating devices 7 which have been diagrammatically represented as reactance and resistance. The primary circuit of the transformer contains an interrupter 8 and the secondary circuit contains an interrupter 9, both of which are rotated in synchronism with the alternating current in supply lines 10, and for this purpose are mounted on a common shaft driven by a synchronous motor 11. These interrupters may be of any approved type as, for instance, copper cylinders having an insulated section, as indicated by the black line in the drawing. The interrupters are set in such a way that the primary circuit is opened just a little sooner than the secondary circuit.

The secondary voltage and load current of the transformer are opposite in phase to the primary voltage and current. Upon applying a voltage causing current to flow through the transformer primary and then through the rectifier from anode to cathode, to which flow the rectifier offers little resistance, a load current will flow in the transformer secondary and through its load circuit. When, however, the voltage reverses and tends to send current in the opposite direction, the rectifier will not transmit the current and there is no voltage available at the primary for maintaining the secondary current. But after the primary current becomes zero, there remains a magnetic flux in the transformer core. This residual flux may be dissipated by breaking the small secondary current which persists after the primary current has ceased. In order to prevent a resumption of current flow in the primary circuit of the transformer, which would take place unless the voltage necessary to restart the arc is relatively high depending upon the conditions, the interrupter 8 opens the primary circuit first and then the interrupter 9 breaks the secondary circuit during some part of the second half wave of each cycle. As the result, the secondary current, while large and positive during the first half cycle, is small and soon broken during the second half cycle, and consequently is in effect a direct pulsating current. Since the synchronous interrupter breaks only the small residual current induced by the decay of the core flux, it need not be large or cumbersome. As is shown below, the condition of no primary current and small secondary current even with a reactive load and a consequent displacement of phase, endures throughout at least the last quarter of each cycle, so that a very rough adjustment of the circuit break will do.

To further illustrate my invention, the following concrete example is here given: This illustration takes up in detail the behavior of the apparatus for no load and for full load and also for each half cycle of voltage. From this illustration, the utility and novel characteristics of this apparatus will become more apparent. As each successive cycle starts under the same conditions, namely, with no current in any part of the system, the conditions considered in the following explanation are extended over only one cycle.

Referring to Fig. 1, let it be assumed that the distributing conductors 10 have impressed thereon an alternating E. M. F. For simplicity the load may be taken as non-inductive. In accordance with these conditions the currents and voltages are as follows: Neglecting the small voltage drop in the rectifier, the primary impressed voltage develops a voltage in the secondary depending in value on the ratio of the ampere turns and 180° out of phase with the primary voltage.

According to common practice in dealing with transformer problems the primary current may be considered as made up of two components, a "load current" depending for value upon the translating devices supplied by the transformer and a "magnetizing current" always the same whatever the connected load may be. When the load circuit is closed, a load current will immediately flow in the transformer secondary. The load current has a demagnetizing effect on the transformer core, as the result of which more primary current must flow to hold the magnetization up to its full value. In other words, in addition to the original magnetizing current, the primary will take a load current which in any instant will be exactly equal in magnetizing strength to the demagnetizing strength of the secondary current. The total primary current is then the sum of a magnetizing and a load component.

Because of the asymmetric property of the mercury arc, which is well understood, the current in the primary circuit of the transformer can never flow in a direction which will make the electrode 3 negative and consequently the primary current ceases to flow after the primary current becomes negative. Therefore during the second half of each cycle the supply lines are in effect cut off from the transformer. At the time this occurs there is flowing in the secondary circuit a current which would be just sufficient to maintain the magnetic flux in the transformer core at the value it had obtained at that instant. As this current is flowing in a circuit of resistance and inductance on which no external electro-motive force is acting, it will slowly die away, but unless the secondary circuit be broken before the end of the cycle, it will not become zero at that time. The transformer field, therefore, will not be zero at the end of the cycle. If this were the case the value of the core flux at any instant during the second cycle would be greater by the amount of this residual field than at a corresponding time during the first cycle. The magnetizing current, therefore, would be proportionately greater during the second cycle and each successive cycle would see an addition to this magnetizing current until it became so great that the primary current would be zero for a short time only during the second half cycle, the length of time depending on the resistance of the circuit and alternating line voltage would be applied at all times to the secondary. As the net result, the secondary current would start as direct current but would deteriorate into alternating current, this deterioration being due to the existence of the residual transformer field. But if the residual field be destroyed, as by the use of an interrupter, after the primary load current has become zero, the second cycle will start under the same conditions as did the first, with the result that virtual direct current will flow in the secondary. No matter how inductive the load considered may be, the load current will be zero by the time the voltage has reached its maximum negative value.

The line can supply no energy when the line voltage acts to make the mercury positive, and the primary and secondary circuits may be opened after the load current is zero with no other penalty than that of dissipating the energy of the transformer field which is not large. Succeeding cycles are exactly like the one above discussed.

To take advantage of both half waves of alternating current, the connection shown in Fig. 2 may be used. This connection comprises a line transformer 12, in the secondary of which is a central tap 13. A mercury rectifier 14 of the usual high-voltage type has its anodes 15 and 16 connected respectively with the terminals of the line transformer through synchronous circuit breakers 17 and 18 and through the primaries 19 and 20 of auxiliary transformers. The secondaries 21 and 22 of the auxiliary transformers are connected respectively through synchronous circuit breakers 23 and 24 to a load 25. The cathode 26 of the mercury rectifier is directly connected with the neutral point 13 of the line transformer. With this arrangement the low voltage secondaries 21 and 22 of the auxiliary transformers will pass alternate half waves of current through the load circuit, where the energy may be used for operating direct current lamps, motors, and the like.

The efficiency of the system is high for the rectifier losses on the high voltage primary current are very small in comparison with the energy transmitted.

What I claim as new and desire to secure by Letters Patent of the United States, is,—

1. The combination of a transformer, means for delivering intermittent pulsations of unidirectional current to the primary winding of said transformer, a load circuit receiving energy from the secondary of said transformer, an interrupter means for operating said interrupter synchronously with the pulsations of the primary current and connections between the interrupter and the secondary circuit whereby the secondary circuit is opened after each impulse of current in the primary winding.

2. The combination of an alternating current source, a transformer, means for delivering to the primary of said transformer alternate half waves of current of one polarity only from said source, a load circuit receiving energy from the secondary of said transformer, and means for opening said load circuit during the half cycles when said primary is not receiving current.

3. The combination of a transformer, means for delivering intermittent impulses of unidirectional current to the primary of said transformer, a load circuit receiving energy from the secondary of said transformer, interrupters for both the primary and secondary circuits, means for operating said interrupters synchronously with the pulsations of primary current and connections between said interrupters and the primary and secondary circuits whereby said circuits are opened at each intermittent cessation of the primary current.

4. The combination of a transformer, means for delivering to the primary of said transformer alternate half waves of alternating current, a load circuit receiving energy from the secondary of said transformer, and means for opening both the primary and secondary circuits during the half cycles when said primary is not carrying current.

5. The combination of a transformer having a primary winding and a secondary winding, of means for preventing the flow of current to said primary winding during alternate half cycles of an alternating current, a current interrupter connected to said transformer to quickly lower the core flux thereof at times when current is not flowing in said primary, and means for operating said interrupter synchronously with the pulsations of primary current.

6. The combination of a transformer primary, a rectifier in series therewith, a secondary for said transformer, a load circuit receiving energy from said secondary, an interrupter and means for operating said interrupter to open the primary and secondary circuits at times when current is not flowing in said primary.

7. The combination of a transformer primary, a vapor rectifier in series therewith, a secondary for said transformer, a load circuit receiving energy from said secondary, interrupters for both the primary and secondary circuits and means for operating the said interrupters in synchronism with the current in said transformer primary.

8. The combination of transformer primary windings, a mercury arc rectifier having a plurality of anodes and a cathode, connections respectively from said primary windings to said anodes, secondary windings in inductive relation respectively to said primaries, a load circuit supplied by said secondaries and interrupting means operatively connected to open the primary and secondary circuits after each pulsation of current.

9. The method of transforming pulsations of current of one voltage to pulsations of current of another voltage which consists in delivering said current to a transformer and dissipating the residual magnetic flux in said transformer during the intervals between successive pulsations.

10. The method of operating a magnetic transformer supplied with separated current waves of the same polarity which consists in dissipating the magnetic flux in said transformer during the intervals between successive pulsations.

In witness whereof, I have hereunto set my hand this 20th day of September, 1911.

FRED W. LYLE.

Witnesses:
JOHN A. McMANUS, Jr.,
ROBERT SHAND.